US012626104B2

(12) United States Patent
Rahmes et al.

(10) Patent No.: US 12,626,104 B2
(45) Date of Patent: *May 12, 2026

(54) METHODS OF TRAINING VARIATIONAL AUTOENCODERS TO RECOGNIZE ANOMALOUS DATA IN DISTRIBUTED SYSTEMS

(71) Applicant: L3Harris Technologies, Inc., Melbourne, FL (US)

(72) Inventors: Mark Rahmes, Melbourne, FL (US); Kevin Fox, Palm Bay, FL (US); Jennifer Spicer, Westminster, MD (US); Shoaib Shaikh, Windermere, FL (US); Macaulay Osaisai, Rockledge, FL (US); Michael Fischer, Indiatlantic, FL (US); Ziad Chaudhry, Melbourne, FL (US)

(73) Assignee: L3Harris Technologies, Inc., Melbourne, FL (US)

( * ) Notice: Subject to any disclaimer, the term of this patent is extended or adjusted under 35 U.S.C. 154(b) by 1136 days.

This patent is subject to a terminal disclaimer.

(21) Appl. No.: 17/591,897

(22) Filed: Feb. 3, 2022

(65) Prior Publication Data

US 2023/0244915 A1 Aug. 3, 2023

(51) Int. Cl.
G06N 3/047 (2023.01)
G06N 3/088 (2023.01)
G06V 10/82 (2022.01)

(52) U.S. Cl.
CPC ............. *G06N 3/047* (2023.01); *G06N 3/088* (2013.01); *G06V 10/82* (2022.01)

(58) Field of Classification Search
CPC ......... G06N 3/047; G06N 3/088; G06V 10/82
See application file for complete search history.

(56) References Cited

U.S. PATENT DOCUMENTS

| | | |
|---|---|---|
| 10,181,185 B2 | 1/2019 | Park et al. |
| 10,373,056 B1 | 8/2019 | Andoni et al. |

(Continued)

OTHER PUBLICATIONS

Hsu et al. (Automated Antenna Testing Using Encoder-Decoder-based Anomaly Detection, Dec. 2021, pp. 135-142) (Year: 2021).*

(Continued)

*Primary Examiner* — George Giroux
(74) *Attorney, Agent, or Firm* — Kane Kessler, P.C.; Barry E. Negrin

(57) ABSTRACT

Methods of training a variational autoencoder (VAE) to recognize anomalous data in a distributed system are provided. Input image data representative of devices/processes in a distributed system are provided to an encoder of a VAE on a processor. The input image data is compressed, via the processor, using a first plurality of weights with the encoder. A normal distribution of the compressed image data is created in a latent space of the VAE. The compressed image data from the latent space is decompressed using a second plurality of weights with a decoder of the VAE. The decompressed image data from the decoder is optimized. At least the first and second plurality of weights are updated, via the processor, based on the loss detected in the optimized decompressed image data. The above steps are iterated until the decompressed image data possesses substantially the same statistical properties as the input image data.

16 Claims, 7 Drawing Sheets

(56) References Cited

U.S. PATENT DOCUMENTS

| | | | |
|---|---|---|---|
| 10,410,113 | B2 | 9/2019 | Clayton et al. |
| 10,528,533 | B2 | 1/2020 | Saini et al. |
| 10,593,033 | B2 | 3/2020 | Niculescu-Mizil et al. |
| 10,600,009 | B1 | 3/2020 | Augustine et al. |
| 10,616,257 | B1 | 4/2020 | Soulhi et al. |
| 10,665,251 | B1 | 5/2020 | Wood, III et al. |
| 10,679,129 | B2 | 6/2020 | Baker |
| 10,733,722 | B2 | 8/2020 | Niculescu-Mizil et al. |
| 10,743,809 | B1 | 8/2020 | Kamousi et al. |
| 10,789,703 | B2 | 9/2020 | Lu et al. |
| 10,812,523 | B2 | 10/2020 | Latapie et al. |
| 10,817,394 | B2 | 10/2020 | Oba |
| 10,839,320 | B2 | 11/2020 | Augustine et al. |
| 10,848,508 | B2 | 11/2020 | Chen et al. |
| 10,860,928 | B2 | 12/2020 | Winih et al. |
| 10,872,209 | B2 | 12/2020 | Ha et al. |
| 10,909,419 | B2 | 2/2021 | Itou et al. |
| 10,909,671 | B2 | 2/2021 | Kimura et al. |
| 10,931,700 | B2 | 2/2021 | Soulhi et al. |
| 10,964,011 | B2 | 3/2021 | Cosatto et al. |
| 10,970,395 | B1 | 4/2021 | Bansal et al. |
| 11,238,307 | B1 * | 2/2022 | Delay ................. G06V 10/761 |
| 12,149,550 | B2 * | 11/2024 | Rahmes ................... G06N 7/01 |
| 12,190,525 | B2 * | 1/2025 | Rahmes ................... G06T 7/13 |
| 12,223,430 | B1 * | 2/2025 | Soleyman ............ G05B 13/027 |
| 2012/0106844 | A1 * | 5/2012 | Ramachandrula .......................... |
| | | | G06V 30/1478 |
| | | | 382/199 |
| 2020/0183047 | A1 | 6/2020 | Denli et al. |
| 2020/0193418 | A1 | 6/2020 | Augustine et al. |
| 2020/0342362 | A1 | 10/2020 | Soni et al. |
| 2021/0065070 | A1 | 3/2021 | Augustine et al. |
| 2021/0387706 | A1 * | 12/2021 | Siganos ................. G06V 10/82 |
| 2021/0390279 | A1 * | 12/2021 | Siganos ............... G06F 18/214 |
| 2023/0061998 | A1 * | 3/2023 | Yang ........................ G06N 3/08 |

OTHER PUBLICATIONS

Guo et al. (Multidimensional Time Series Anomaly Detection: A GRU-based Gaussian Mixture Variational Autoencoder Approach, 2018, pp. 97-112) (Year: 2018).*

Liu et al. (Dynamic Game Theoretic Neural Optimizer, Jun. 2021, pp. 1-19) (Year: 2021).*

Maini et al. (Study and Comparison of Various Image Edge Detection Techniques, Feb. 2009, pp. 1-12) (Year: 2009).*

Ross et al. (Implementing Image Processing Algorithms for the Epiphany Many-Core Coprocessor with Threaded MPI, 2015, pp. 1-6) (Year: 2015).*

Makhzani et al. (Adversarial Autoencoders, May 2016, pp. 1-16) (Year: 2016).*

Amini, A., Schwarting, W., Rosman, G., Araki, B., Karaman, S. & Rus. D. (Oct. 2018). Variational autoencoder for end-to-end control of autonomous driving with novelty detection and training debiasing. In 2018 IEEE/RSJ International Conference on Intelligent Robots and Systems (IROS) (pp. 568-575). IEEE.

An, J., & Cho S. (2015). Variational autoencoder based anomaly detection using reconstruction probability. Special Lecure on IE, 2(1), 1-18.

Chen T., Liu, X., Xia B., Wang, W., & Lai, Y. (2020). Unsupervised anomaly detection of industrial robots using sliding-window convolutional variational autoencoder. IEEE Access, 8, 47072-47081.

Daudt, R.C., Le Saux, B., Boulch, A. and Gousseau, Y., Jul. 2018, Urban Change Detection for Multispectral Earth Observation Using Convolutional Neural Networks. In IEEE International Geoscience and Remote Sensing Symposium (IGARSS) 2018 (pp. 2115-2118). IEEE.

Fan, Y., Wen, G., Li, D., Qiu, S., Levine, M.D., & Xiao, F. (2020). Video anomaly detection and localization via gaussian mixture fully convolutional variational autoencoder. Computer Vision and Image Understanding, 195, 102920.

Gong, D., Liu, L., Le, V., Saha, B., Mansour, M.R., Venkatesh, S., & Hengel, A. V.D. (2019). Memorizing normality to detect anomaly: Memory-augmented deep autoencoder for unsupervised anomaly detection. In Proceedings of the IEEE/CVF International Conference on Computer Vision (pp. 1705-1714).

Kawachi, Y., Koizumi, Y., & Harada, N. (Apr. 2018). Complementary set variational autoencoder for supervised anomaly detection. In 2018 IEEE International Conference on Acoustics, Speech and Signal Processing (ICASSP) (pp. 2366-2370). IEEE.

Kingma, D. P., & Welling, M. (2013). Auto-encoding variational bayes. arXiv preprint arXiv:1312.6114.

LeCun, Y., C. Cortes, and C.J.C. Burges. "The MNIST Database of Handwritten Digits." http://yann.lecun.com/exdb/mnist/. Accessed Apr. 19, 2021.

Li, L., Yan, J., Wang, H., & Jin, Y. (2020). Anomaly detection of time series with smoothness-inducing sequential variational autoencoder. IEEE transactions on neural networks and learning systems.

Memarzadeh, M., Matthews, B., & Avrekh, I. (2020). Unsupervised Anomaly Detection in Flight Data Using Convolutional Variational Auto-Encoder. Aerospace, 7(8), 115.

Nguyen, Q.P., Low, K.H., Lim, K.W., Chan, M.C., & Divakaran, D.M. Gee: A Gradient-based Explainable Variational Autoencoder for Network Anomaly Detection.

Norlander, E. & Sopasakis, A. (2019). Latent space conditioning for improved classification and anomaly detection. arXiv preprint arXiv: 1911.10599.

Sun. J., Wang, X., Xiong, N., & Shao, J. (2018). Learning sparse representation with variational auto-encoder for anomaly detection. IEEE Access, 6, 33353-33361.

Wang, R., Nie, K., Wang, T., Yang, Y., & Long, B. (Jan. 2020). Deep learning for anomaly detection. In Proceedings of the 13th International Conference on Web Search and Data Mining (pp. 894-896).

Wiewel, F., & Yang, B. (May 2019). Continual learning for anomaly detection with variational autoencoder. In ICASSP 2019-2019 IEEE International Conference on Acoustics, Speech and Signal Processing (ICASSP) (pp. 3837-3841). IEEE.

Xu, H., Chen, W., Zhao, N., Li, Z., Bu, J., Li, Z., . . . & Qiao, H. (Apr. 2018). Unsupervised anomaly detection via variational autoencoder for seasonal kpis in web applications. In Proceedings of the 2018 World Wide Web Conference (pp. 187-196).

Yan, S. Smith, J.S., Lu, W., & Zhang, B. (2018). Abnormal event detection from videos using a two-stream recurrent variational autoencoder. IEEE Transactions on Cognitive and Developmental Systems, 12(1), 30-42.

Yao, R., Liu, C., Zhang, L., & Peng, P. (Jun. 2019). Unsupervised anomaly detection using variational auto-encoder based feature extraction. In 2019 IEEE International Conference on Prognostics and Health Management (ICPHM)(pp. 1-7). IEEE.

Zavrak, S. & Iskefiyeli, M. (2020). Anomaly-based intrusion detection from network flow features using variational autoencoder. IEEE access, 8, 108346-108358.

Zerrouki, Y., Harrou, F., Zerrouki, N., Dairi, A., & Sun, Y. (2020). Desertification Detection Using an Improved Variational AutoEncoder-Based Approach through ETM-Landsat Satellite Data. IEEE Journal of Selected Topics in Applied Earth Observations and Remote Sensing, 14, 202-213.

Zimmerer, D., Kohl, S.A., Petersen, J., Isensee, F., & Maier-Hein, K.H. (2018). Context-encoding variational autoencoder for unsupervised anomaly detection. arXiv preprint arXiv:1812-05941.

Wang, L., Schwing, A., & Lazebnik, S. (2017). Diverse and accurate image description using a variational auto-encoder with an additive gaussian encoding space. Advances in Neural Infomation Processing Systems, 30.

* cited by examiner 106     100

104

SYSTEM MEMORY

VOLATILE

NON-VOLATILE

PROCESSING
UNIT 102

REMOVABLE STORAGE
108

NON-REMOVABLE
STORAGE 110

OUTPUT DEVICE(S)
116

INPUT DEVICE(S)
114

COMMUNICATION
CONNECTION(S) 112

COMPUTING DEVICE 100

COMPUTING DEVICE 100

NETWORK 118

METHODS OF TRAINING VARIATIONAL AUTOENCODERS TO RECOGNIZE ANOMALOUS DATA IN DISTRIBUTED SYSTEMS

BACKGROUND OF THE INVENTION

Field of the Invention

The invention is directed to variational autoencoders (VAEs). More specifically, the invention is directed to methods for efficiently and effectively training VAEs to recognize anomalous data, e.g., in networked devices and/or distributed systems such as antenna systems, air traffic control systems, computer networks, and the like.

Description of Related Art

Machine learning (ML) and artificial intelligence (AI) often require the use of vast amounts of training data for scoring an ML model. In many cases, the data needed for this work is either hard to acquire or has access restrictions due to the sensitivity of the data (e.g., asset locations, proprietary messages within a data stream, configuration of devices including Internet Protocol (IP) addresses, personal identifiable information, etc.). There has been an ongoing debate withing the AI research community of best practices for protecting sensitive data, and synthetic data generation is the preeminent solution.

It is however difficult to create or augment an existing dataset synthetically that still retains the underlying statistical properties of the original "truth" dataset. The ability to synthesize sensitive datasets will enable the use of more accessible compute resources that are currently not allowable. Additionally, the ability to synthesize data will facilitate more robust validation testing of Machine Learning models, which is critical for safety critical applications. Data for edge or corner cases may not be available but could easily be generated synthetically to provide a more robust training set. Similarly, anomalies could be created synthetically and injected to test and validate datasets for enhanced sensitivity analysis.

For various ML use cases, including prediction, anomaly detection, and others, training data is either non-existent, sensitive in nature, or insufficient for modeling purposes. Current data generation techniques are overly simplistic and select observations to randomly duplicate. This leads to missed opportunities in the training framework for edge cases and validation testing. There are currently no other viable techniques for creating statistically sound training datasets that can either augment existing datasets or create new ones altogether.

Current approaches for synthetic data generation include rudimentary approaches such as random oversampling to augment training datasets. For an imbalanced dataset, the minority sample observations will be randomly oversampled. This oversample will copy or duplicate the entire feature set of the minority class. While this leads to a more balanced dataset, the quality of the data remains in question as it does not provide a statistically meaningful representation of the original entire dataset.

In the area of anomaly detection, one example is a network or array of antennae. If each antenna is inspected by comparing current data of, e.g., coverage, with known normal data, one can find anomalies. Unfortunately, some antenna networks/arrays are huge and complex, e.g., include thousands of antennae. Comparing normal data versus current data for thousands of antennae is impractical. Due to the cumbersome nature of this task, months often go by without anyone looking for (let alone finding) anomalies.

One tool that can be of use in ML/AI endeavors is a variational autoencoder. VAEs, like other autoencoders, each include an encoder, a decoder, and latent space. In a typical autoencoder, the encoder learns to compress (reduce) the input data into an encoded representation, the decoder learns to reconstruct the original data from the encoded representation to be as close to the original input as possible, and the latent space is the layer that contains the compressed representation of the input data.

VAEs differ from regular autoencoders in that they do not use the encoding-decoding process simply to reconstruct an input. Instead, they impose a probability distribution on the latent space, and they learn the distribution so that the distribution of outputs from the decoder matches that of the observed data. Then, they sample from this distribution to generate new data. A VAE assumes that the source data has some sort of underlying probability distribution (such as Gaussian) and then attempts to find the parameters of the distribution. A variational autoencoder is a generative system and serves a similar purpose as a generative adversarial network. One main use of a variational autoencoder is to generate new data that is related to the original source data. In the case of the instant invention, the new data is used for additional training and testing analysis.

There is a long-felt need to provide an effective way to generate synthetic data for training a VAE in applications such as anomaly detection. There is a long-felt need to provide an effective way to synthetic data generation that maintains the underlying statistical properties of the original dataset. There is a long-felt need to provide an effective way to generate synthetic data that can be applied to sensitive datasets where traditional data masking falls short of protecting the data. There is a long-felt need to provide faster methods of synthetic training data for a VAE.

SUMMARY OF THE INVENTION

The above and other objects are achieved by the invention, which is a method of training a VAE.

In an embodiment, the invention is a method of training a variational autoencoder to recognize anomalous data in a distributed system to be analyzed. In an embodiment, the method includes the step of: a) providing input image data representative of one or more devices or processes in the distributed system to be analyzed to an encoder of a variational autoencoder on a processor; b) compressing, via the processor, the input image data using a first plurality of weights with the encoder; c) creating, via the processor, a normal distribution of the compressed image data in a latent space of the variational autoencoder; d) decompressing, via the processor, the compressed image data from the latent space using a second plurality of weights with a decoder of the variational autoencoder; e) optimizing, via the processor, the decompressed image data from the decoder; and f) updating, via the processor, at least the first and second plurality of weights based on the loss detected in the optimized decompressed image data.

In an embodiment, the latent space includes an n-D point scatter plot. In an embodiment, the latent space includes a 3-D point scatter plot that includes hidden vector values.

In an embodiment, the optimizing step e) further includes the steps of: generating, via the processor, a plurality of probabilistic models of the decoded image data; and determining, via the processor, which of the plurality of models is optimal. In an embodiment, the step of determining which of the plurality of models is optimal further includes the steps of: applying a game theoretic optimization to the plurality of models, and selecting which of the plurality of models to use to generate the n-D point scatter plot in latent space. In an embodiment, the updating step f) further includes the steps of: applying a game theoretic optimization to the plurality of models, and selecting which of the plurality of models to use to update the first and second plurality of weights. In an embodiment, the plurality of models includes at least two of Adam, Stochastic Gradient Descent with Momentum (SGDM), or Root Mean Squared Propagation (RMSProp).

In an embodiment, the method further includes the step of g) iterating at least steps b)—f) until the decompressed image data possesses substantially the same statistical properties as the input image data. Such statistics include ELBO (Evidence Lower Bound) loss, which is reconstruction loss plus KL (Kullback-Leibler) loss (described below). Steps b)—f) are preferably iterated until the error does not statistically decrease and validation patience is achieved (the number of times that the validation loss can be larger than or equal to the previously smallest loss before network training stops).

In an embodiment, the method further includes the step of preprocessing the decompressed image prior to optimizing the decompressed image data via an image gradient Sobel edge detector. In an embodiment, the method further includes the step of returning a floating-point edge metric via the image gradient Sobel edge detector.

The invention also includes a non-transitory computer-readable storage medium, including one or more programs for executing a model of training a variational autoencoder to recognize anomalous data in a distributed system. The model is configured to: a) provide image input data representative of one or more devices or processes in the distributed system to be analyzed to an encoder of a variational autoencoder on a processor; b) compress, via the processor, the image input data using a first plurality of weights with the encoder; c) create, via the processor, a normal distribution of the compressed image data in a latent space of the variational autoencoder; d) decompress, via the processor, the compressed image data from the latent space using a second plurality of weights with a decoder of the variational autoencoder; e) optimize, via the processor, the decompressed image data from the decoder; and f) update, via the processor, at least the first and second plurality of weights based on the loss detected in the optimized decompressed image data.

In an embodiment, the model is further configured to g) iterate at least steps b)-f) until the decompressed image data possesses substantially the same statistical properties as the input image data. Such statistics include ELBO loss, which is reconstruction loss plus KL loss (described below). Steps b)-f) are preferably iterated until the error does not statistically decrease and validation patience is achieved (the number of times that the validation loss can be larger than or equal to the previously smallest loss before network training stops).

In an embodiment, the latent space includes an n-D point scatter plot. In an embodiment, the latent space includes a 3-D point scatter plot that includes hidden vector values.

In an embodiment, the model is configured to optimize, via the processor, the decompressed image data from the decoder by being further configured to: generate, via the processor, a plurality of probabilistic models of the decoded image data; and determine, via the processor, which of the plurality of models is optimal. In an embodiment, the model is further configured to: apply a game theoretic optimization to the plurality of models; and select which of the plurality of models to use to generate the n-D point scatter plot in latent space. In an embodiment, the model is further configured to: apply a game theoretic optimization to the plurality of models; and select which of the plurality of models to use to update the first and second plurality of weights. In an embodiment, the plurality of models includes at least two of Adam, SGDM, or RMSProp.

In an embodiment, the model is further configured to preprocess the decompressed image prior to optimizing the decompressed image data via an image gradient Sobel edge detector. In an embodiment, the model is further configured to return a floating-point edge metric via the image gradient Sobel edge detector.

DETAILED DESCRIPTION OF THE INVENTION AND DRAWINGS

Description will now be given with reference to the attached FIGS. 1-6. It should be understood that these figures are exemplary in nature and in no way serve to limit the scope of the invention, which is defined by the claims appearing hereinbelow.

Figure 6:
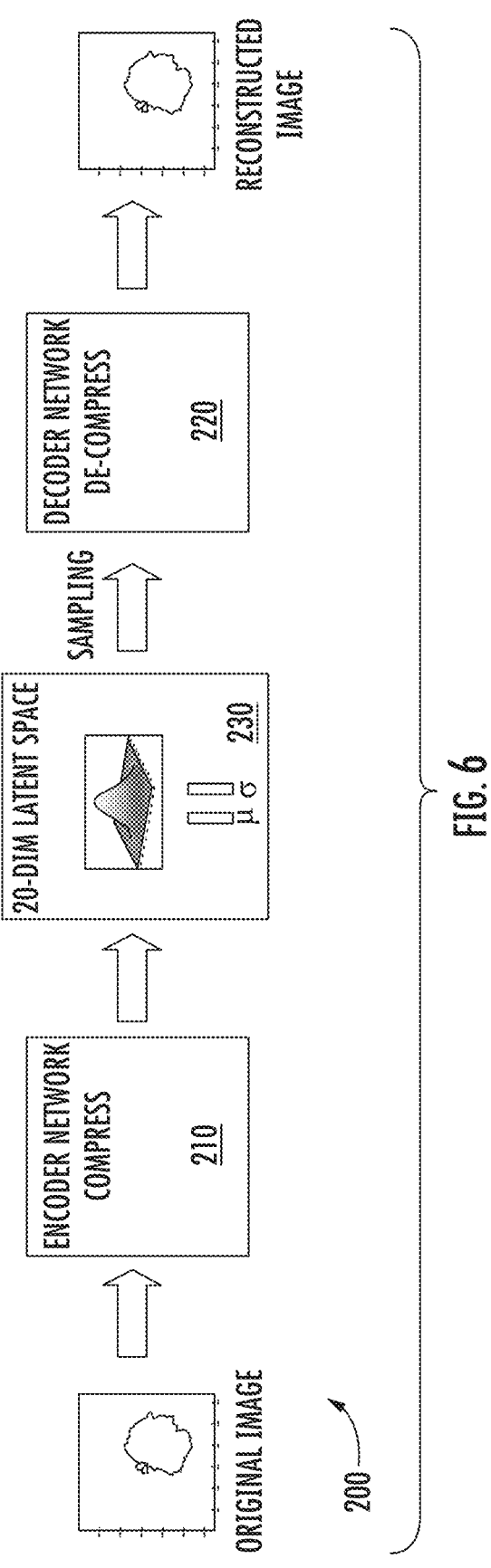
FIG. 6 is a block diagram of a typical variational autoencoder.

A basic diagram of a VAE is shown in FIG. 6. VAE 200 includes an encoder 210, a decoder 220, and latent space 230 therebetween. As noted above, VAEs impose a probability distribution on the latent space, and learn the distribution so that the distribution of outputs from the decoder matches that of the observed data. Then, they sample from this distribution to generate new data. A VAE assumes that the source data has some sort of underlying probability distribution (such as Gaussian) and then attempts to find the parameters of the distribution. One use of a VAE is to generate new data related to the original source data. In the case of the instant invention, the new data is used for additional training and testing analysis.

Figure 1:
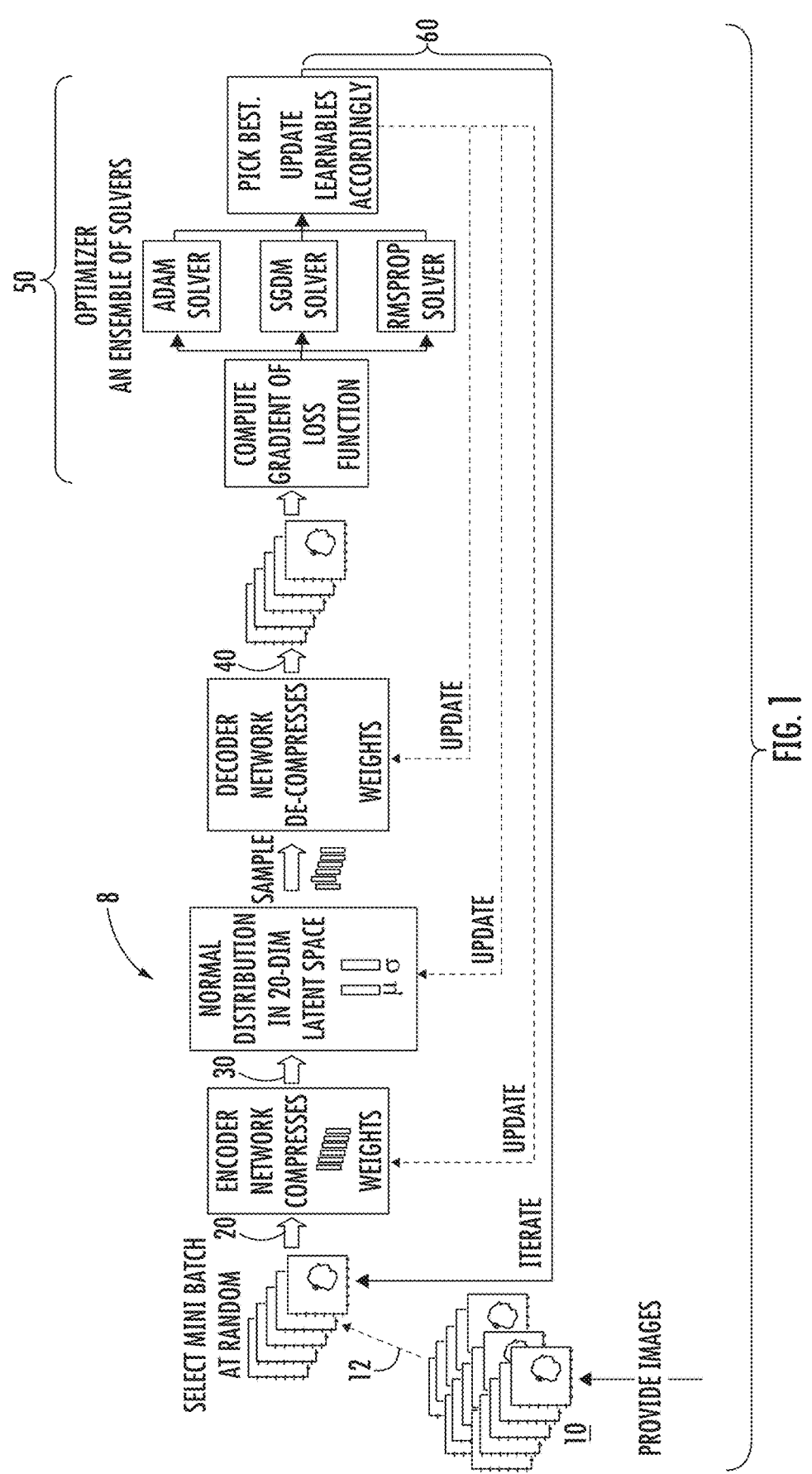
FIG. 1 is a system flow diagram of a variational autoencoder being trained with game theory optimization in accordance with an embodiment of the invention.
Figure 2:
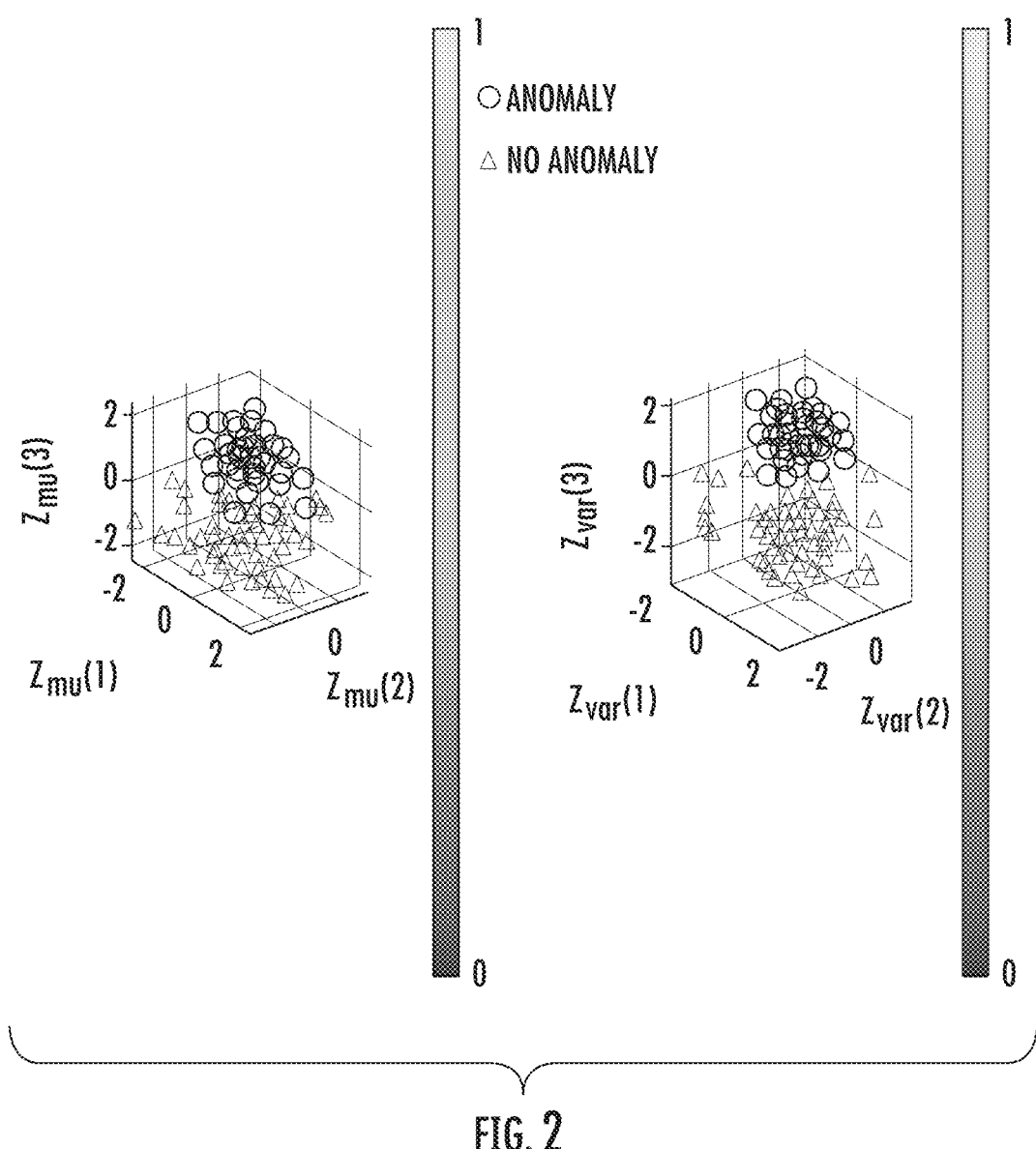
FIG. 2 is a 3-D scatter plot of the mean and variance latent space hidden vectors in accordance with an embodiment of the invention.
Figure 3:
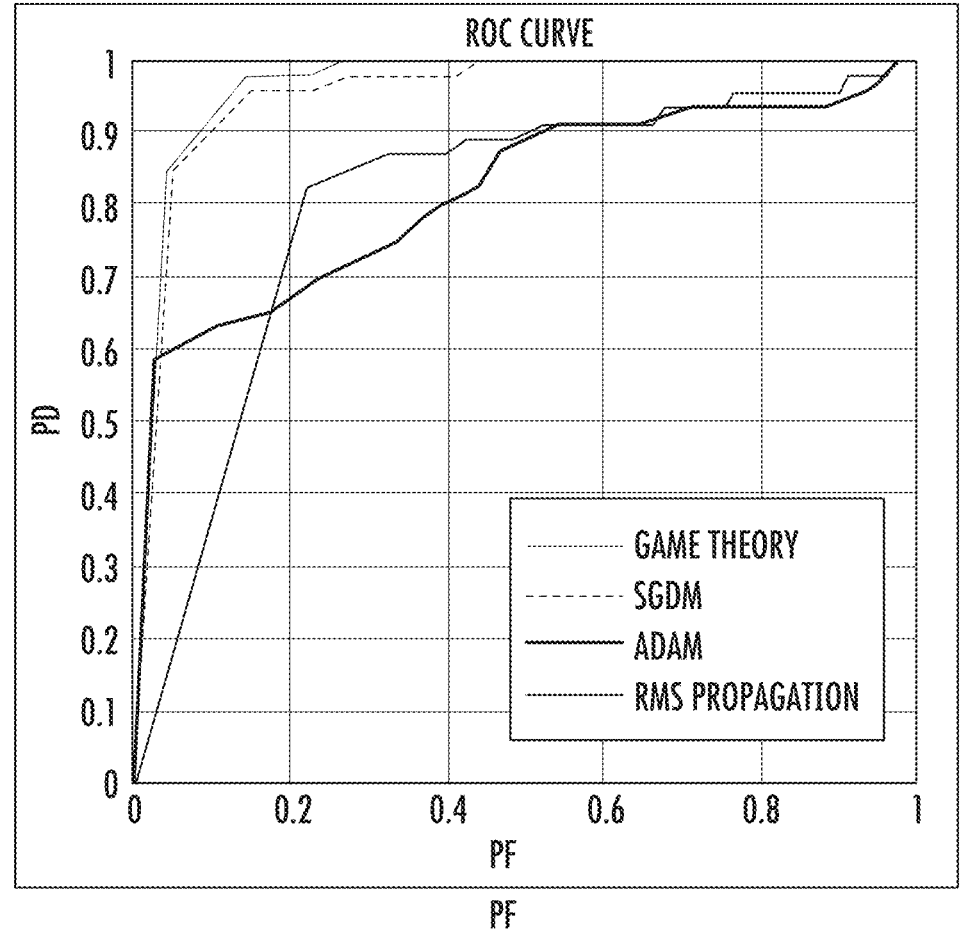
FIG. 3 is an ensemble of ROC curves in accordance with an embodiment of the invention.

FIG. 1 depicts a typical process flow 8 of an embodiment of the invention. The goal of the method is ultimately to train a VAE to be able to detect or enable a user to detect anomalous behavior within a distributed system. This can take the form of a device malfunction, a cyberattack, signal interference, and the like.

At step 10, data is input into the system. Images are provided, and a subset or mini-batch are selected at random at step 12. The data in this case can represent any aspect or aspects of one or more devices and/or processes of the distributed system to be tested. In the example of a computer network, the data can include overall network performance, individual device performance, performance of a plurality of devices clustered together, usage parameters such as bandwidth usage or CPU (central processing unit) usage, memory usage, connectivity issues, Wi-Fi coverage, cellular signal, syslog, Netflow, data logs, Intrusion Detection System (IDS) alerts and more. In the example of an air traffic control system, data can include to overall performance, individual device performance, performance of a plurality of devices clustered together, parameters such as latitude, longitude, altitude, and more. In antenna systems, the data can be images of antenna coverage, such as those shown in FIG. 1, and the like.

In an embodiment, in conjunction with step 10 or step 12, an image gradient Sobel edge detector may be used as a preprocessing step. This preprocessing step helps the models to learn more quickly and with more accuracy. In an embodiment, the image gradient Sobel edge detector is configured to return a floating-point edge metric.

At step 20, the data is provided to the encoder of the VAE. The VAE forces input data onto a multidimensional Gaussian distribution. In an embodiment, the system preferably utilizes a 20-dimensional distribution, although other distributions can also be utilized. The system learns the means and variances of the data (20 means and variances in the previously mentioned embodiment), and the resulting distribution describes the data.

The encoder generates a compressed representation of the input data at step 30 utilizing various weights and biases. Weights are the parameters within a neural network that transform input data within the network's hidden layers. A neural network is made up of a series of nodes. Within each node is a set of inputs, weight, and a bias value. As an input enters the node, it gets multiplied by a weight value, and the resulting output is either observed or passed to the next layer in the neural network. Often, the weights of a neural network are contained within the hidden layers of the network. Within a neural network, an input layer is provided that takes the input signals and passes them to the next layer. Next, the neural network contains a series of hidden layers which apply transformations to the input data. It is within the nodes of the hidden layers that the weights are applied. For example, a single node may take the input data and multiply it by an assigned weight value, then add a bias before passing the data to the next layer. The final layer of the neural network is also known as the output layer. The output layer often tunes the inputs from the hidden layers to produces the desired numbers in a specified range.

Weights and bias are both learnable parameters inside the network. A teachable neural network will randomize both the weight and bias values before learning initially begins. As training continues, both parameters are adjusted toward the desired values and the correct output. The two parameters differ in the extent of their influence upon the input data. At its simplest, bias represents how far off the predictions are from their intended value. Biases make up the difference between the function's output and its intended output. A low bias suggest that the network is making more assumptions about the form of the output, whereas a high bias value makes less assumptions about the form of the output. Weights, on the other hand, can be thought of as the strength of the connection. Weight affects the amount of influence a change in the input will have upon the output. A low weight value will have no change on the input, and alternatively a larger weight value will more significantly change the output.

In any event, the compressed representation of the input data is called the hidden vector. The mean and variance from the hidden vector are sampled and learned by the convolutional neural network (CNN). Principal component analysis (PCA) of the hidden vector allows for the visualization of n-D point clusters, preferably 3-D point clusters, in the latent space (see FIG. 2). To make calculations more numerically stable, the range of possible values is increased by making the network learn from the logarithm of the variances. Two vectors are defined: one for the means, and one for the logarithm of the variances. Then, these two vectors are used to create the distribution from which to sample.

In step 40 onward, the decoder process generates synthetic output data. The system uses an ensemble of solvers with game theoretic implementation to create an output image with least image reconstruction error (to be described in more detail below).

In step 50, the process is iterated via reparameterization to handle sampling of the hidden vector during backpropagation (an algorithm for training neural networks). An ensemble of models are generated using three different solvers: Adam, SGDM, and RMSProp. The values from the loss function (evidence lower bound or ELBO, reconstruction, and Kullback-Leibler or KL loss, to be discussed below) can be used in a game theoretic implementation to determine the optimal model to use per test sample. The loss is used to compute the gradients of the solvers.

There are several aspects to step 50:

Custom Training Loop—Both networks (mean and variance hidden vectors) are trained with a custom training loop, and automatic differentiation is enabled;

Function Model—The function model, Gradients, takes in the encoder and decoder objects and a mini-batch of input data and returns the gradients of the loss with respect to the learnable parameters in the networks;

Sampling & Loss—The function performs this process in two steps: sampling and loss. The sampling step samples the mean and the variance vectors to create the final encoding to be passed to the decoder network;

Reparameterization—Because backpropagation through a random sampling operation is not possible, it is necessary to use the reparameterization trick. This moves the random sampling operation to an auxiliary variable, which is then shifted by the mean and scaled by the standard deviation.

The loss function has the following attributes:

Loss Step—passes the encoding generated by the sampling step through the decoder network and determines the loss, which is then used to compute the gradients. The loss in VAEs, also called the evidence lower bound (ELBO) loss, is defined as a sum of two separate loss terms: reconstruction loss+KL loss.

Reconstruction Loss—measures how close the decoder output is to the original input by using the mean-squared error (MSE).

Kullback-Leibler (KL) Divergence—measures the difference between two probability distributions. Minimizing the KL loss in this case means ensuring that the learned means and variances are as close as possible to those of the target (normal) distribution.

Practical Effect—The practical effect of including the KL loss term is to pack clusters learned due to reconstruction loss tightly around the center of the latent space, forming a continuous space from which to sample.

The method generates an ensemble of models using three different solvers: Adam, SGDM, and RMSProp. Game theory is used to select the optimal solution from the ensemble. The values from the loss function (ELBO, Reconstruction, and KL loss) can be used in a game theoretic implementation to determine the optimal model to use per test sample. The loss is used to compute the gradients of the solvers.

Optimization utilizes a linear program to optimally choose which deep learning model to use per data point. A reward matrix, A, is created with data image loss values for different solvers. An MxC reward matrix is constructed where M is the number of models in the ensemble (typically three) and C is the number of loss inputs (KL, ELBO, and reconstruction loss). One model is used for each solver, for a total of three models: Adam; SGDM; and RMSProp. The matrix is solved for each image. A goodness-of-fit metric is used, $f(x)$, from the reconstruction and KL loss scores or responses. An objective function, b, is used which minimizes the cost loss function per image. An interior-point algorithm, i.e., the primal-dual method, is used, which must be feasible for convergence. The Primal Standard form used to calculate optimal solver is:

$$\text{minimize } f(x) \, s.t. \tag{1}$$

$$Ax \leq b \tag{2}$$

$$x \geq 0 \tag{3}$$

In an embodiment, the three types of loss are put in a table having three columns and three rows. The rows correspond to the solvers Adam, SGDM, and RMSprop; as such, the rows reflect the decision to be made. The columns are the parameters that are input, resulting in the reward matrix mentioned above. The reward matrix is fit into a linear program, and boundary conditions are set. When the linear program is run, the result informs which row has the least error. That row corresponds to one of the solvers. Thus, on a per sample basis, the solver is selected with the lowest loss or error, and the weights and biases are updated in accordance with a linear program dual simplex method in an iterative manner in step 60 to minimize loss. Once loss has been reduced to an acceptable level (e.g., Receiver Operating Characteristic (ROC) curves are used to measure and visualize the effectiveness of anomaly detection), the VAE is properly trained to examine live data and make determinations about whether the data is anomalous or not.

Figure 4A:
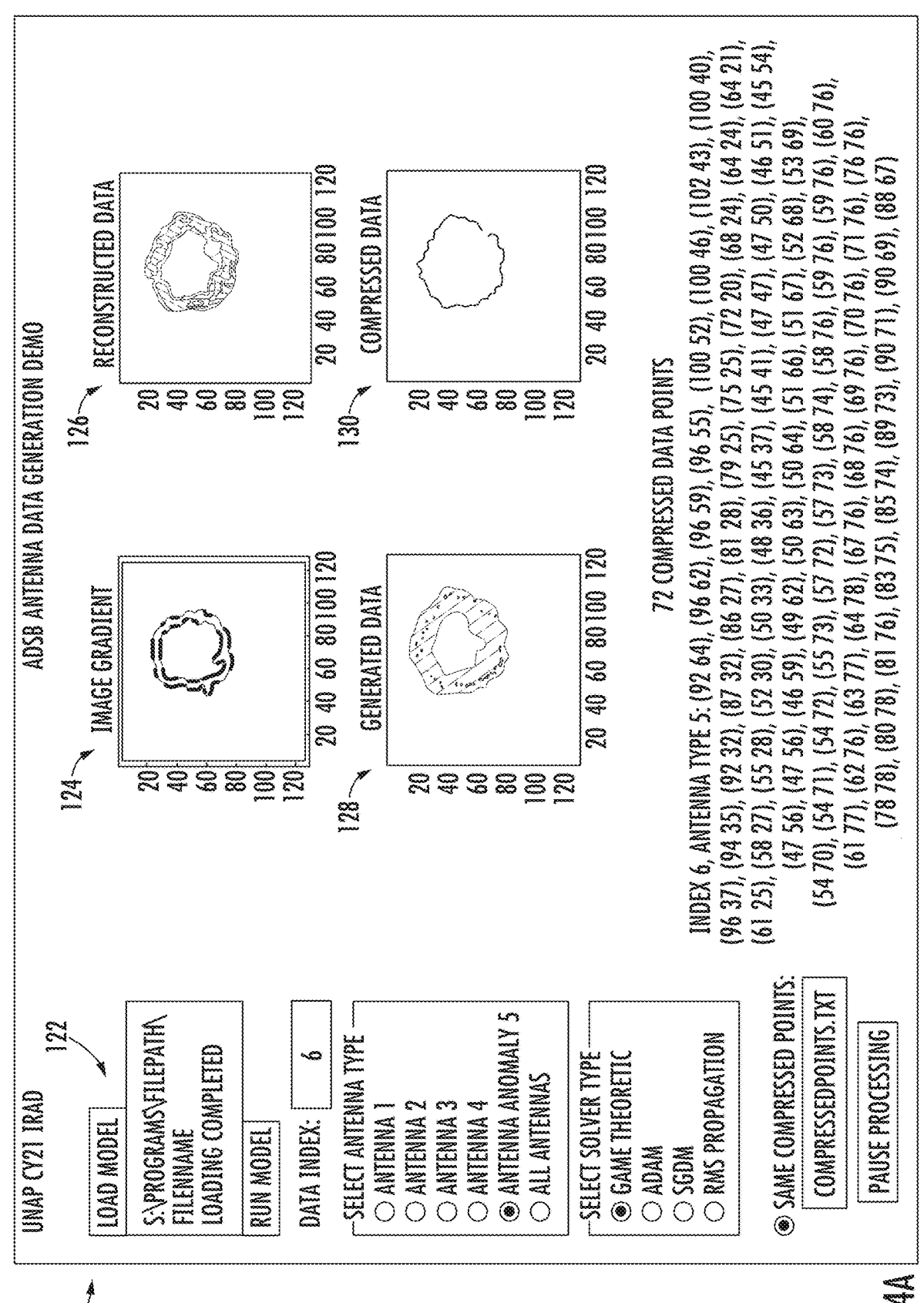
FIG. 4A is an exemplary visualization tool that shows data ingest, preprocessing, reconstruction, and data compression during variational autoencoder training in accordance with an embodiment of the invention.
Figure 4B:
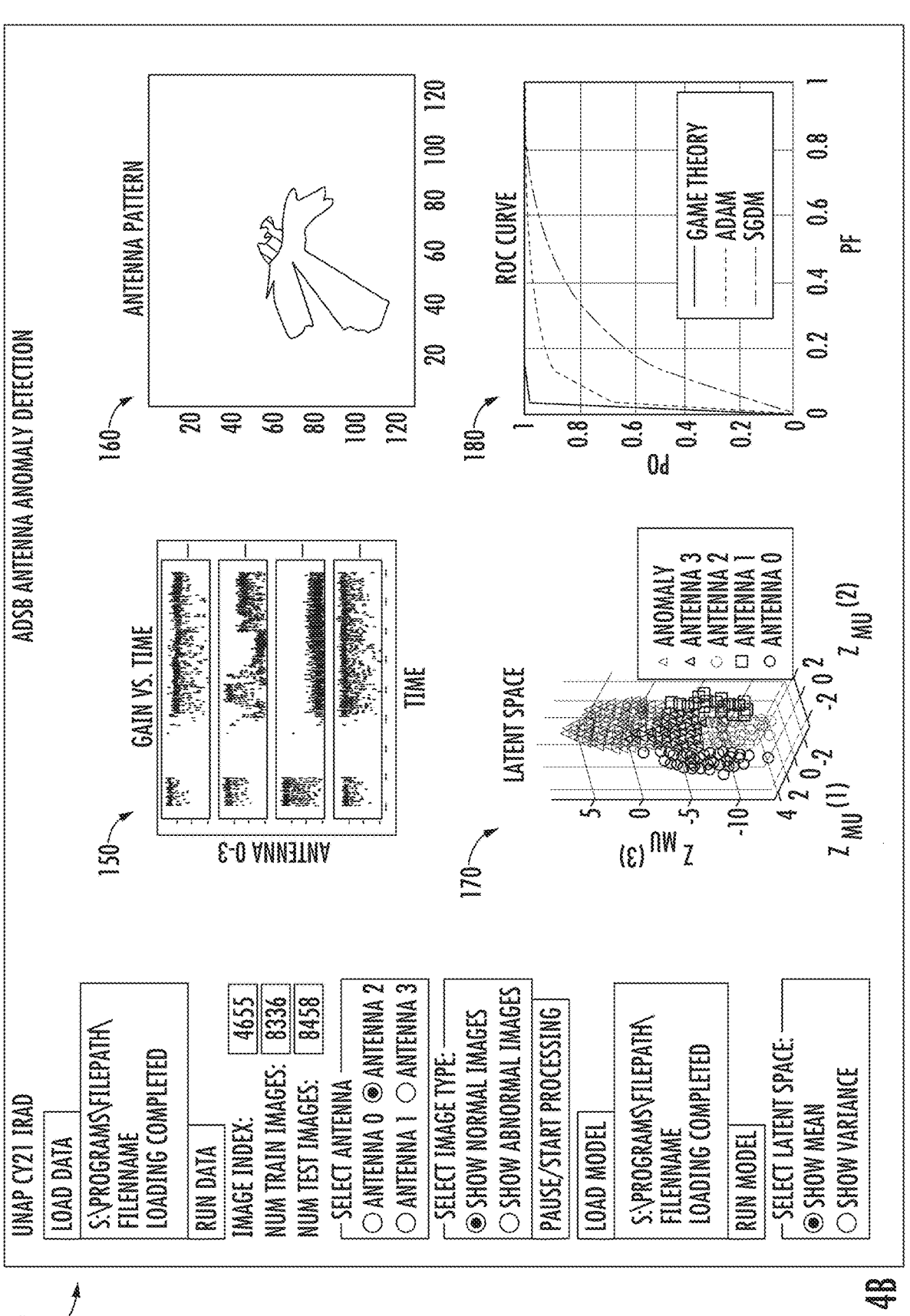
FIG. 4B is an exemplary visualization tool of a trained variational autoencoder detecting anomalies for use by a data analyst in accordance with an embodiment of the invention.

An exemplary visualization tool 120 depicting the various variational autoencoder training steps in shown in FIG. 4A. Tool 120 is shown for antenna coverage, e.g., for an aviation surveillance system such as ADS-B or for other terrestrial communication systems such as a cellular network. Tool 120 has a data loading section 122 in which the model is loaded and run, an antenna type is selected, and the solver type is selected. In image gradient graph 124, the Sobel edge detector is run on raw antenna gain pattern data, resulting in the highlighted pattern shown. The preprocessed data is then run through the variational autoencoder, i.e., it is encoded and decoded, and the resulting reconstructed data is shown in graph 126. Certain select portions of the data are kept, e.g., 72 data points out of 360 (e.g., corresponding to a sampling of every five degrees), and the result is shown in generated data graph 128. Finally, the pixels along each five degrees radial line from center outward are analyzed and the pixel with the highest magnitude is kept as a compressed point and the result is shown in compressed data graph 130. Graph 130 displays the decoded synthetic data that can be used as test data.

Once the VAE is properly trained to examine live data and make determinations about whether the data is anomalous or not, it can be used in a wide variety of applications. An exemplary visualization tool 140 that aides in such a determination is shown in FIG. 4B, again concerned with antenna anomaly detection for, e.g., an aviation surveillance system such as ADS-B or a cellular network. Tool 140 depicts incoming antenna gain with respect to time plotted in graph 150. The antenna pattern under test as selected by the user is depicted in graph 160, and the user can see where that sample is located in the latent space 3-D point scatter plot shown in graph 170. Here, four different sets of normal antenna scatter plot data are depicted Antenna 0, Antenna 1, Antenna 2, and Antenna 3) as well as anomalous data. The relevant ROC curves being utilized are shown in graph 180.

Other visualizations are possible, from the complex to a simple blinking light to alert the analyst that something is amiss. The system itself can have anomaly thresholds pre-set and settable to self-determine whether an event rises to the level of an incident requiring a response.

In an embodiment, the neural network architecture is as follows. In the encoder layer:

```
encoderLG = layerGraph([
    • imageInputLayer(imageSize,'Name','input_encoder','Normalization','none')
    • convolution2dLayer(3,4,'Padding','same','Name','conv_1')
    • batchNormalizationLayer('Name','BN_1')
    • reluLayer('Name','relu_1')
    • maxPooling2dLayer(1,'Stride',1, 'Name','max1')
    • convolution2dLayer(3,8,'Padding','same','Stride',2, 'Name','conv_2')
    • batchNormalizationLayer('Name','BN_2')
    • reluLayer('Name','relu_2')
    • maxPooling2dLayer(1,'Stride', 1, 'Name','max2')
    • convolution2dLayer(3,16,'Padding','same','Stride',2,'Name','conv_3')
    • batchNormalizationLayer('Name','BN_3')
    • reluLayer('Name','relu_3')
    • maxPooling2dLayer(1,'Stride', 1, 'Name','max3')
    • convolution2dLayer(3,32,'Padding','same','Stride',2,'Name','conv_4')
    • batchNormalizationLayer('Name','BN_4')
    • reluLayer('Name','relu_4')
    • maxPooling2dLayer(1,'Stride', 1, 'Name','max4')
    • convolution2dLayer(3,64,'Padding','same','Stride',2,'Name','conv_5')
    • batchNormalizationLayer('Name','BN_5')
    • reluLayer('Name','relu_5')
```

-continued

```
    •   maxPooling2dLayer(1,'Stride', 1, 'Name','max5')
    •   convolution2dLayer(3,128,'Padding','same','Stride',2,'Name','conv__6')
    •   batchNormalizationLayer('Name','BN__6')
    •   reluLayer('Name','relu__6')
    •   fullyConnectedLayer(2*latentDim,'Name','fc')]);
In the decoder layer:
decoderLG = layerGraph([
    imageInputLayer([1 1
latentDim],'Name','i','Normalization','none')
    transposedConv2dLayer(8, 64, 'Cropping', 'same', 'Stride', 8,
'Name', 'transpose1')
    reluLayer('Name','relu1')
    transposedConv2dLayer(3, 32, 'Cropping', 'same', 'Stride', 2,
'Name', 'transpose2')
    reluLayer('Name','relu2')
    transposedConv2dLayer(3, 16, 'Cropping', 'same', 'Stride', 2,
'Name', 'transpose3')
    reluLayer('Name','relu3')
    transposedConv2dLayer(3, 8, 'Cropping', 'same', 'Stride', 2,
'Name', 'transpose4')
    reluLayer('Name','relu4')
    transposedConv2dLayer(3, 1, 'Cropping', 'same', 'Stride', 2,
'Name', 'transpose7')
    ]);
```

Once a VAE is trained in the above manner, it can be used to monitor a distributed system in a manner as follows. For example, a computer network can be monitored (e.g., via syslog, Nedlow, etc.) for bandwidth usage, high volume of log files coming in from a particular IP address on the network, any parameter that is running out of the ordinary range, etc. Anything outside the norm of the operational parameters would indicate an anomaly within the network. Activity within the network is reported (from multiple data streams) that would be detected by the network and captured by any event log (e.g. Syslog event). The following list indicates some of the activity that may be detected, but this list does not encompass all activity which may be detected:

Denial of Service Attack—high packets per second rate. Makes resources less available due to excessive authentication and requests to the server;

Brute Force—someone or something may be trying to log into a system repeatedly with high number of attempts. This would be indicative of someone trying to hit a server with various usernames and passwords that try to gain access;

Unknown IP/MAC Address—unknown IP and or MAC (Media Access Control) address that the system has not seen before would indicate an attack or threat;

Data Deviation—any deviation from the baseline traffic would indicate an alert and flag the data as suspicious;

Bandwidth—excessive data transmit/receive may indicate a large portion of bandwidth being used which may indicate an attack or threat;

Data Exfiltration—observing excessive outbound traffic or a spike in traffic at unusual times which is inconsistent with history (previous network patterns).

The network is being monitored by tools used to collect telemetry data concerning, e.g., syslog data from network devices such as servers, routers, switches, and the like, suspicious IP addresses, device failure, a number of servers being part of a botnet or have malware installed, or any network device exhibiting a different or out of the ordinary type of behavior. The data can be batch or steaming. Examples of streaming data would be Kafka, Amazon Web Services (AWS) Kinesis Firehose, ActiveMQ, Solace, or the like.

In any case, a state of the network, or a subset of the network (a cluster of machines, a single machine, etc.) generates device status information that is sent to the processor running the inventive VAE. The device status information is preprocessed via an image gradient Sobel edge detector, and then fed to the encoder of the VAE. The encoder takes the preprocessed data and converts it into a 20-dimensional Gaussian distribution with hidden vectors for mean and variance in the latent space. The top three dimensions are selected, and the visualization of the data is now a 3-dimensional data point in the latent space. That data point is compared to an existing previously learned scatter plot of non-anomalous conditions that had been fed through the VAE to populate the latent space. Alternatively, the data point in question is compared to an existing previously learned scatter plot of anomalous conditions that had been fed through the VAE. The further away the data point in question is from the non-anomalous plot, the more likely the data point represents an anomaly requiring attention. This is especially useful in edge cases, i.e., data points that lie on the edge of the anomalous/non-anomalous border, e.g., the highlighted data point being identified in latent space in FIG. 4B on the border of the normal and anomaly regions. Coming into the VAE and exiting the VAE, the data is optimized via a game theory implementation of three solvers; the solver with the least error is chosen for each quantum of data.

The following are some of the key areas where the invention can help in such fields as the telecom industry and aviation. It integrates, fuses, and correlates millions of network, telemetry, and service events per day from various disparate sources. It leverages AI and ML to anticipate events proactively that may cause issues within the network. It automates the trouble ticketing process by identifying root causes and recommending the next best action within minutes, reducing mean time to detect (MTTD) and mean time to repair (MTTR). It integrates multiple sources of security analytics and identifies the risks in the system. It creates personalized dashboards for network and security engineers so that they can have up to date situational awareness for decision making. Its built-in ML algorithms help reduce time to detect and resolve incidents that do occur, thus improving quality of service and reducing the overall cost of addressing downtimes and outages. Additionally, the invention can help telecom operators find areas of efficiencies and synergies where it can translate into savings and opportunities to the customer. Additionally, the invention can enhance resiliency and responsiveness of the overall Air Traffic Management system and underlaying infrastructure through predicting network behavior with deeper insight.

Figure 5:
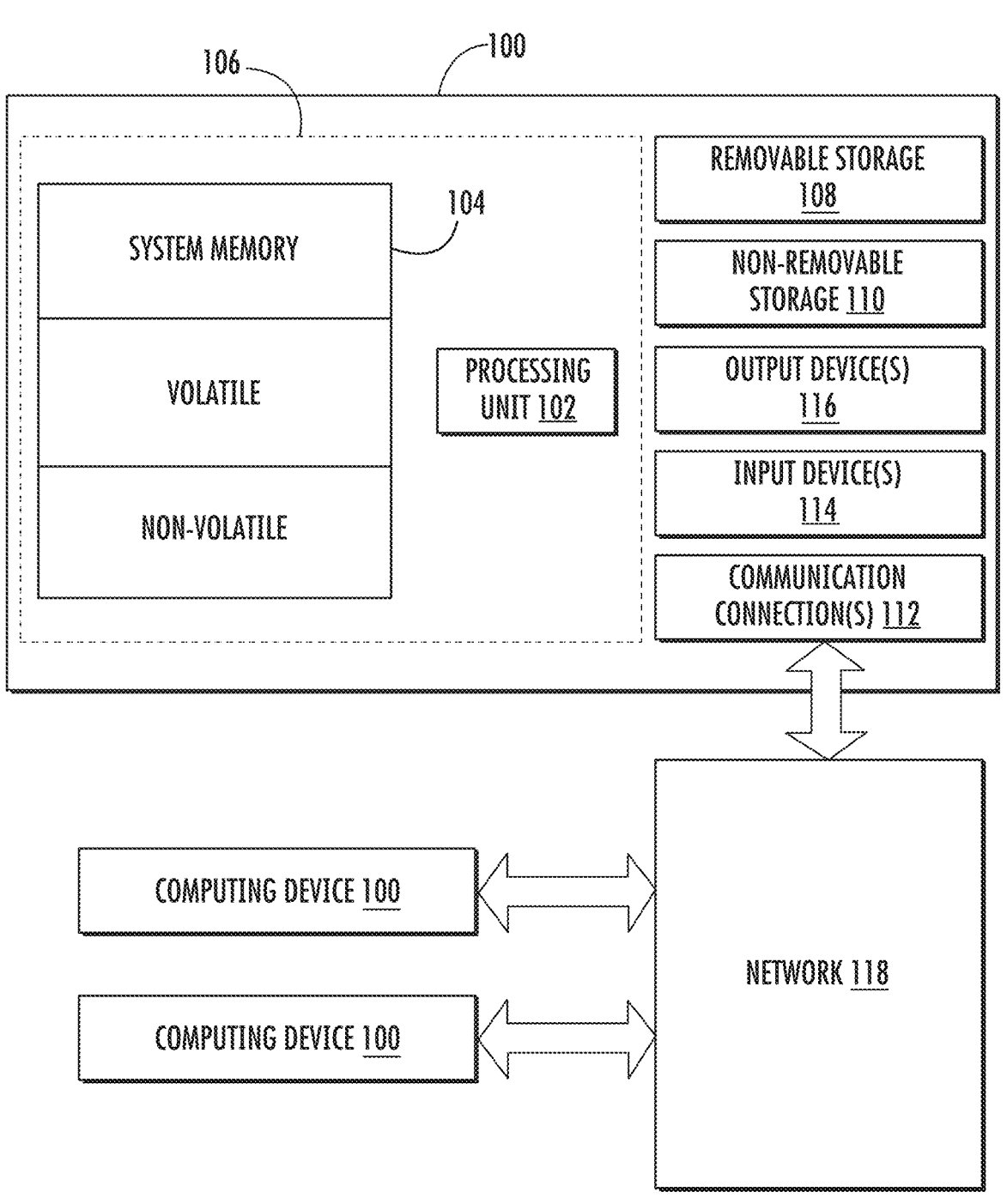
FIG. 5 is a block diagram of an exemplary computing environment within which various embodiments of the invention may be implemented and upon which various embodiments of the invention may be employed.

FIG. 5 depicts an exemplary computing environment in which various embodiments of the invention may be implemented and upon which various embodiments of the invention may be employed. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal electronic devices such as smart phones and smart watches, tablet computers, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 5 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 5 by removable storage 108 and non-removable storage 110. Computing device 100 as used herein may be either a physical hardware device, a virtual device, or a combination thereof.

Computing device 100 typically includes or is provided with a variety of computer-readable media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, Random Access Memory (RAM), Read-Only Memory (ROM), electrically erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known and therefore need not be discussed in any detail herein except as provided.

Notably, computing device 100 may be one of a plurality of computing devices 100 inter-connected by a network 118, as is shown in FIG. 5. As may be appreciated, the network 118 may be any appropriate network; each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as universal serial bus (USB) flash drives, Secure Digital (SD) memory cards, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations. In an embodiment, the system can be developed using MATLAB of MathWorks, in particular MATLAB version 2020b.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

The invention is not limited to the above description. For example, while examples of anomaly detection is distributed systems such as antenna systems, air traffic control systems, or computer networks have been provided, the invention is also useful for training VAEs in other fields of endeavor, such as image pixel based change detection to detect new construction; signal modulation anomaly detection or new signal detection; missile trajectory path anomaly detection; aircraft flight path runway approach anomaly detection, and others.

Additionally, the invention has much broader applications across an array of industries and for a variety of purposes, including IT and DevOps, manufacturing, healthcare, fintech, and in the public sector. For example, enterprise cloud providers can leverage this solution to increase visibility into their infrastructure, providing valuable insights so that they can take proactive actions. This helps with simplified operations, faster service delivery, and improved experience for end customers. The economic benefits include reduced operational expenses (OpEx), faster time to service, and significant savings in total cost of ownership (TCO).

Having described certain embodiments of the invention, it should be understood that the invention is not limited to the above description or the attached exemplary drawings. Rather, the scope of the invention is defined by the claims appearing hereinbelow and includes any equivalents thereof as would be appreciated by one of ordinary skill in the art. For clarity, "at least one of A or B" means either A, or B, or both A and B.

What is claimed is:

1. A method of training a variational autoencoder to recognize anomalous data in a distributed system, comprising the step of:

a) providing input image data representative of one or more devices or processes in the distributed system to be analyzed to an encoder of a variational autoencoder on a processor;

b) compressing, via the processor, the input image data using a first plurality of weights with the encoder;

c) creating, via the processor, a normal distribution of the compressed image data in a latent space of the variational autoencoder, wherein the latent space includes an n-D point scatter plot;

d) decompressing, via the processor, the compressed image data from the latent space using a second plurality of weights with a decoder of the variational autoencoder;

e) optimizing, via the processor, the decompressed image data from the decoder; and f) updating, via the processor, at least the first and second plurality of weights based on loss detected in the optimized decompressed image data, wherein the optimizing step e) further comprises the steps of:

generating, via the processor, a plurality of probabilistic models of the decoded image data; and determining, via the processor, which of the plurality of models is optimal, and wherein the step of determining which of the plurality of models is optimal further comprises the steps of:

applying a game theoretic optimization to the plurality of models; and selecting which of the plurality of models to use to generate the n-D point scatter plot in latent space.

2. A method of training a variational autoencoder to recognize anomalous data in a distributed system according to claim 1, wherein the latent space includes a 3-D point scatter plot that includes hidden vector values.

3. A method of training a variational autoencoder to recognize anomalous data in a distributed system according to claim 1, wherein the updating step f) further comprises the steps of:

applying a game theoretic optimization to the plurality of models; and selecting which of the plurality of models to use to update the first and second plurality of weights.

4. A method of training a variational autoencoder to recognize anomalous data in a distributed system according to claim 1, wherein the plurality of models includes at least two of Adam, SGDM, or RMSProp.

5. A method of training a variational autoencoder to recognize anomalous data in a distributed system according to claim 1, further comprising the step of preprocessing the decompressed image prior to optimizing the decompressed image data via an image gradient Sobel edge detector.

6. A method of training a variational autoencoder to recognize anomalous data in a distributed system according to claim 5, further comprising the step of returning a floating-point edge metric via the image gradient Sobel edge detector.

7. A method of training a variational autoencoder to recognize anomalous data in a distributed system according to claim 3, further comprising the step of g) iterating at least steps b)-f) until the decompressed image data possesses substantially the same statistical properties as the input image data.

8. A method of training a variational autoencoder to recognize anomalous data in a distributed system according to claim 1, wherein the distributed system includes at least one of an antenna system, an air traffic control system, or a computer network.

9. A non-transitory computer-readable storage medium, comprising one or more programs for executing a model of training a variational autoencoder to recognize anomalous data in a distributed system, wherein the model is configured to:

a) provide image input data representative of one or more devices or processes in the distributed system to be analyzed to an encoder of a variational autoencoder on a processor;

b) compress, via the processor, the image input data using a first plurality of weights with the encoder;

c) create, via the processor, a normal distribution of the compressed image data in a latent space of the variational autoencoder, wherein the latent space includes an n-D point scatter plot;

d) decompress, via the processor, the compressed image data from the latent space using a second plurality of weights with a decoder of the variational autoencoder;

e) optimize, via the processor, the decompressed image data from the decoder; and f) update, via the processor, at least the first and second plurality of weights based on the loss detected in the optimized decompressed image data, wherein the model is configured to optimize, via the processor, the decompressed image data from the decoder by being further configured to:

generate, via the processor, a plurality of probabilistic models of the decoded image data; and determine, via the processor, which of the plurality of models is optimal, and wherein the model is further configured to:

apply a game theoretic optimization to the plurality of models; and select which of the plurality of models to use to generate the n-D point scatter plot in latent space.

10. A non-transitory computer-readable storage medium according to claim 9, wherein the latent space includes a 3-D point scatter plot that includes hidden vector values.

11. A non-transitory computer-readable storage medium according to claim 9, wherein the model is further configured to:

apply a game theoretic optimization to the plurality of models; and select which of the plurality of models to use to update the first and second plurality of weights.

12. A non-transitory computer-readable storage medium according to claim 9, wherein the plurality of models includes at least two of Adam, SGDM, or RMSProp.

13. A non-transitory computer-readable storage medium according to claim 9, the model being further configured to preprocess the decompressed image prior to optimizing the decompressed image data via an image gradient Sobel edge detector.

14. A non-transitory computer-readable storage medium according to claim 13, the model being further configured to return a floating-point edge metric via the image gradient Sobel edge detector.

15. A non-transitory computer-readable storage medium according to claim 11, the model being further configured to:

g) iterate at least steps b)-f) until the decompressed image data possesses substantially the same statistical properties as the input image data.

16. A non-transitory computer-readable storage medium according to claim 9, wherein the distributed system includes at least one of an antenna system, an air traffic control system, or a computer network.

* * * * *